Aug. 4, 1953 J. E. ROBINSON 2,647,944

SINGLE CARRIER TRANSMISSION OF SOUND AND VIDEO SIGNALS

Filed Nov. 26, 1946 5 Sheets-Sheet 1

INVENTOR.
James E. Robinson
BY
Byerly, Watson & Simonds
ATTORNEYS

Aug. 4, 1953 J. E. ROBINSON 2,647,944

SINGLE CARRIER TRANSMISSION OF SOUND AND VIDEO SIGNALS

Filed Nov. 26, 1946 5 Sheets-Sheet 2

INVENTOR.
James E. Robinson
BY
Byerly, Watson & Lizards
ATTORNEYS

Aug. 4, 1953 J. E. ROBINSON 2,647,944

SINGLE CARRIER TRANSMISSION OF SOUND AND VIDEO SIGNALS

Filed Nov. 26, 1946 5 Sheets-Sheet 3

INVENTOR.

James E. Robinson

BY

Byerly, Watson & Simonds

ATTORNEYS

Aug. 4, 1953 J. E. ROBINSON 2,647,944

SINGLE CARRIER TRANSMISSION OF SOUND AND VIDEO SIGNALS

Filed Nov. 26, 1946 5 Sheets-Sheet 4

INVENTOR.

James E. Robinson

BY

Byerly, Watson & Simonds

ATTORNEYS

SINGLE CARRIER TRANSMISSION OF SOUND AND VIDEO SIGNALS

Filed Nov. 26, 1946 5 Sheets-Sheet 5

INVENTOR.
James E. Robinson
BY
Byerly, Watson & Simonds
ATTORNEYS

Patented Aug. 4, 1953 2,647,944

UNITED STATES PATENT OFFICE 2,647,944

SINGLE CARRIER TRANSMISSION OF SOUND AND VIDEO SIGNALS

James E. Robinson, Buffalo, N. Y., assignor to American Optical Company, Southbridge, Mass., a voluntary association of Massachusetts Application November 26, 1946, Serial No. 712,264

3 Claims. (Cl. 178—5.6)

This invention relates to a system for the transmission of intelligence by radio.

The primary object of the invention is to provide for the transmission of pictures and sound on the same carrier wave. The invention provides synchronized means for generating interlaced picture signals and pulses, transmitting them on a common carrier wave, and separating them at the receiving end. The sound is transmitted by the series of pulses, which have a frequency of recurrence greater than the frequency of the sound to be transmitted. Modulating means at the transmitting end make the energy of each pulse correspond to the momentary intensity of the sound when the pulse is generated. At the receiving end, sound is generated from the modulated series of pulses by an inertia means having a decay period longer than the pulse intervals.

A further object of my invention is to provide a generator of modulated pulses in which no beating between the pulse frequency and the modulating frequency occurs. The new pulse generator comprises a cathode ray tube in which the creating and timing of the pulses and the modulating of the pulses are effected by different types of deflection of the electron stream.

A still further object of my invention is to provide a method and apparatus for recreating sound from modulated pulses without the use of filters or other expensive apparatus. This object is achieved by applying the pulses to a resonant circuit tuned to an harmonic of the frequency of recurrence of the pulses to provide a high-frequency sinusoidal modulated carrier wave, and then suppressing the carrier by a detector or demodulator.

In explaining the invention, I shall refer to the accompanying drawings in which.

Figure 6:
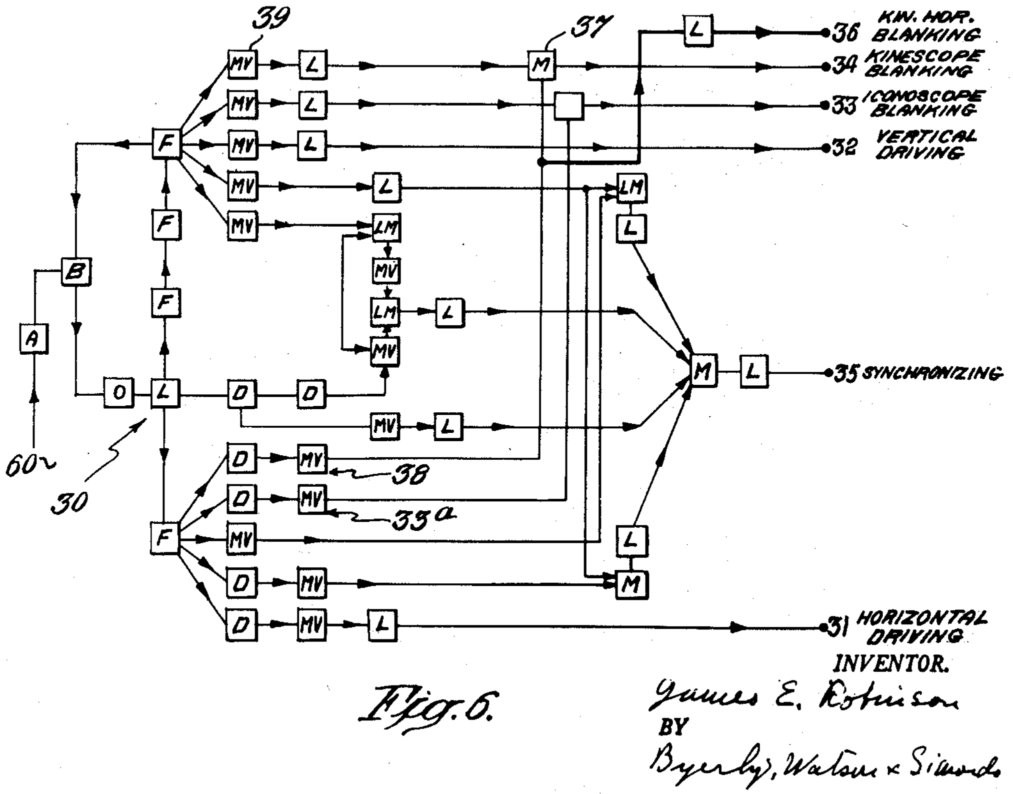
Fig. 6 is a block diagram of a synchronous generator for effecting the timing shown in Fig. 5.
Figures 6A, 7, 8:
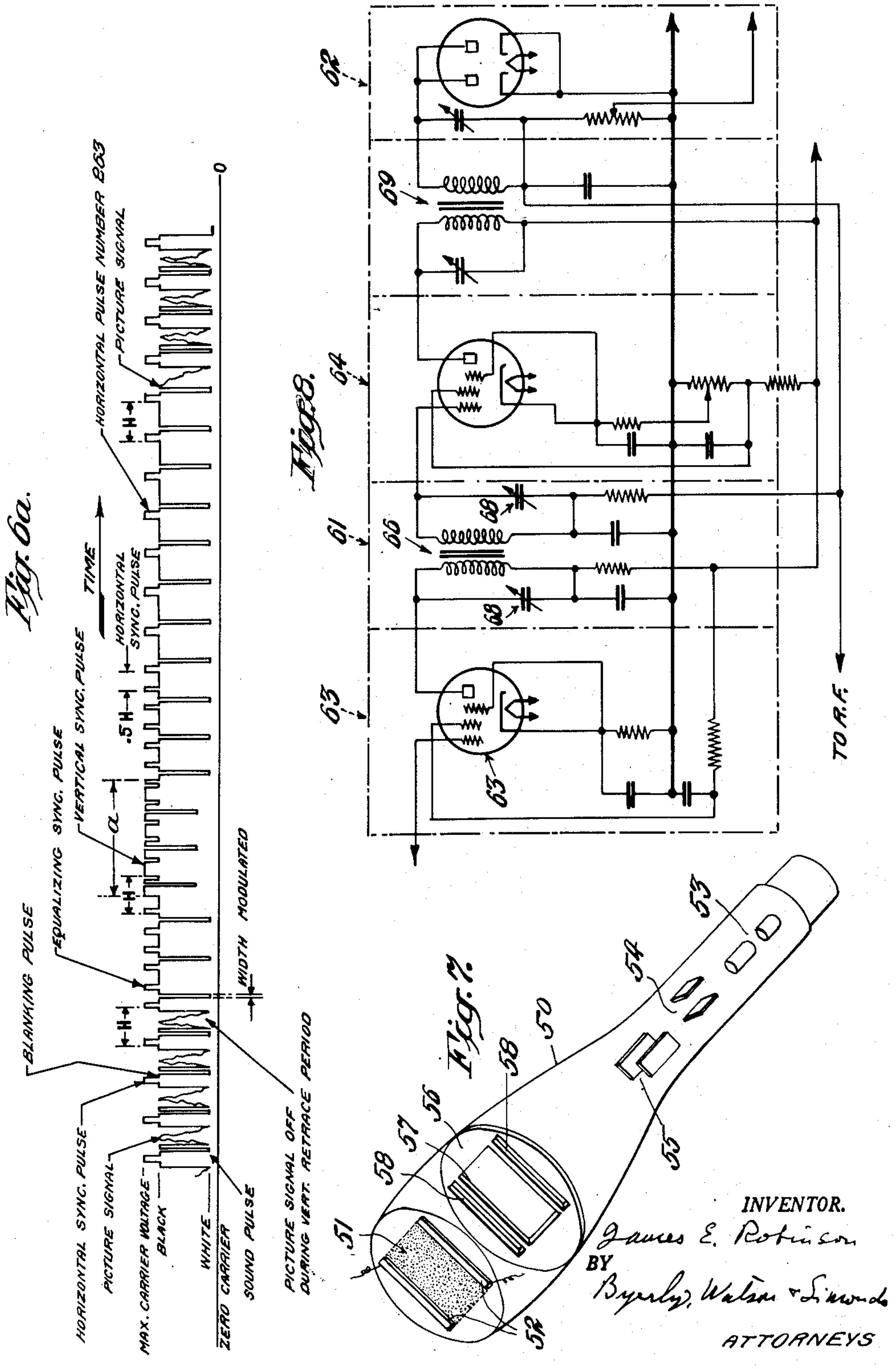

Fig. 6*a* is a diagram of the wave form of the signal put out by the transmitter of my system when only one wedge-shaped area is provided in the target of the pulse-generating tube;

Fig. 7 is a perspective view of a cathode ray tube for separating picture signals and sound pulses in accordance with my invention; and Fig. 8 is a diagram of a circuit for recreating an audio wave from sound-modulated pulses in accordance with my invention.

Figure 1:
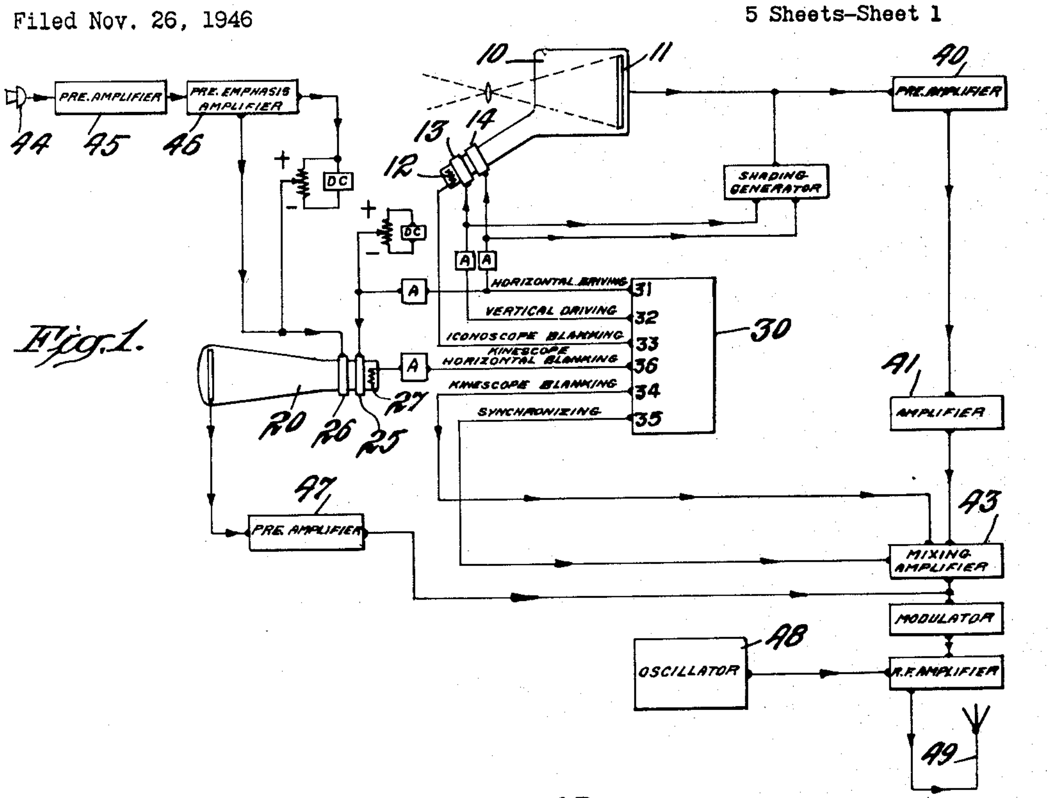
Figs. 1 and 2 are a block diagram of a complete sound and picture communication system embodying my invention, Fig. 1 showing the transmitter and Fig. 2 the receiver.
Figure 2:
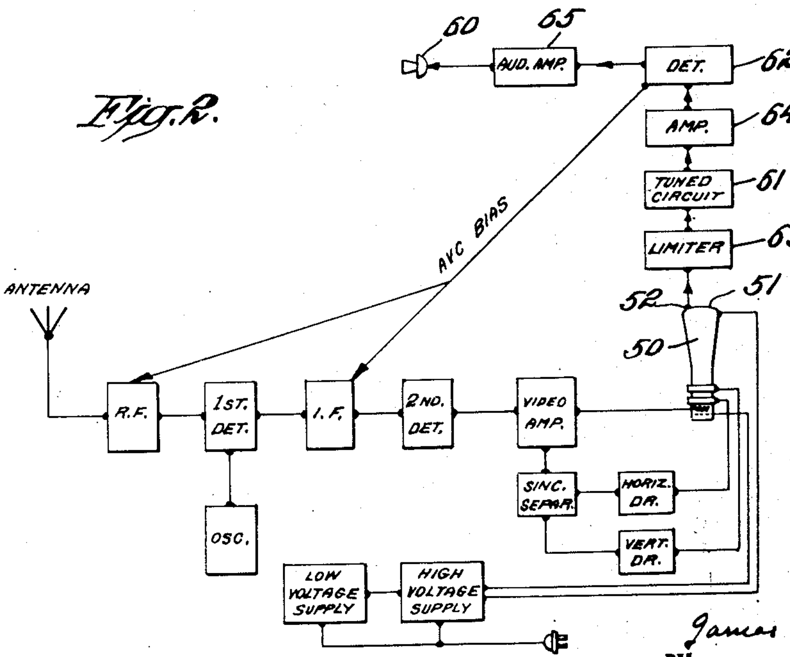

A complete system for communicating sound and pictures on a common carrier wave in accordance with my invention is shown in the block diagrams, Figs. 1 and 2.

At the transmitting end shown in Fig. 1, there are two cathode ray tubes 10 and 20 for creating respectively picture signals and sound-modulated pulses. The picture tube 10 may be of conventional construction. It is shown in Fig. 1 as the type of tube called an iconoscope in which the light of the picture to be transmitted is focused on a mosaic screen 11 which is scanned by a stream of electrons from an electron gun whose trace on the mosaic screen is determined by horizontal and vertical deflecting means 13, 14 which receive the usual saw-tooth voltages from a synchronous generator 30. The output from the mosaic screen anode 21 of the picture tube is passed through the usual amplifiers 40, 41 to a mixing amplifier 43.

The pulse-generator tube 20, which is hereinafter described in detail, puts out a series of pulses whose time-widths vary in accordance with the instantaneous intensity of the sound received in the microphone 44. The output of the tube 20 passes through a pre-amplifier 47 and then to the output of the mixing amplifier 43.

A synchronizing signal from a terminal 35 of the synchronous generator 30 and kinescope blanking impulses from its terminal 34 are introduced into the mixing amplifier 43. The combined outputs of the mixing amplifier and the pulse-generator tube 20 modulate a carrier wave produced by an oscillator 48 and the modulated carrier is radiated from an antenna 49 in the usual manner.

The circuit at the receiving end, shown in Fig. 2, is in general similar to that ordinarily used in a television receiver. The circuits connecting the receiving antenna to the cathode tube 50 will be recognized as those ordinarily used for receiving pictures in a television receiver.

The cathode ray tube 50 is of a special construction which forms part of my invention and is hereinafter described in detail. In addition to the usual fluorescent screen 51 on which the picture signals are converted into a visible picture, the tube is provided with one or more special anodes 52 on which voltages corresponding to the sound-modulated series of pulses are felt. The anode 52 is connected to a loud-speaker 60 through a means for recreating the sound from the pulses, which constitutes a part of my invention and is hereinafter described in detail. As shown in Fig. 2, this means includes a resonant circuit 61 and a detector 62, as well as a limiter 63 and suitable amplifiers 64, 65. The AVC bias for the intermediate-frequency amplifier of the receiving system is obtained from the detector 62.

The pulse generator consists essentially of a cathode ray tube having a target which is provided with one or more wedge-shaped areas whose response to the cathode ray is different from the response of the remaining area of the target, so that the tube produces a pulse when its cathode ray crosses one of these wedge-shaped areas. The target may be constructed in various different ways. Its high-response area is most desirably and area in which the electrons strike a metal capable of high secondary emission of electrons, such as aluminum. Its area of low response may be provided by a conductor capable of less secondary emission, such as carbon, which may lie in the same plane as the area of high response, or it may be provided by a conducting area lying in a different plane from the area of high response and insulated from it, so that it serves as a shield. The two arrangements are equivalent so far as my invention is concerned, but the latter is to some degree preferable since by shielding the response of the low-response area it may be reduced to zero.

Figure 3:
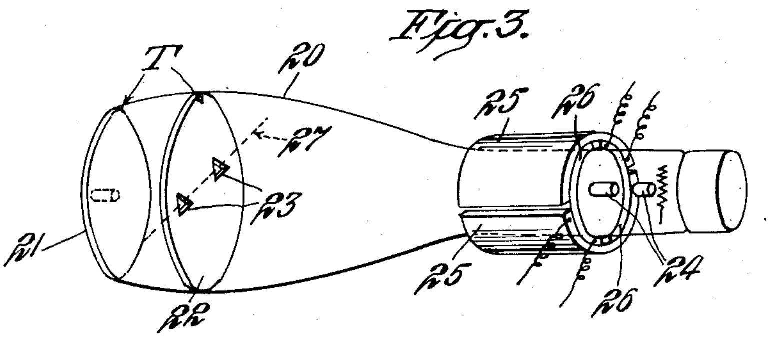
Fig. 3 is a perspective view of a pulse-generating tube embodying my invention.
Figure 4:
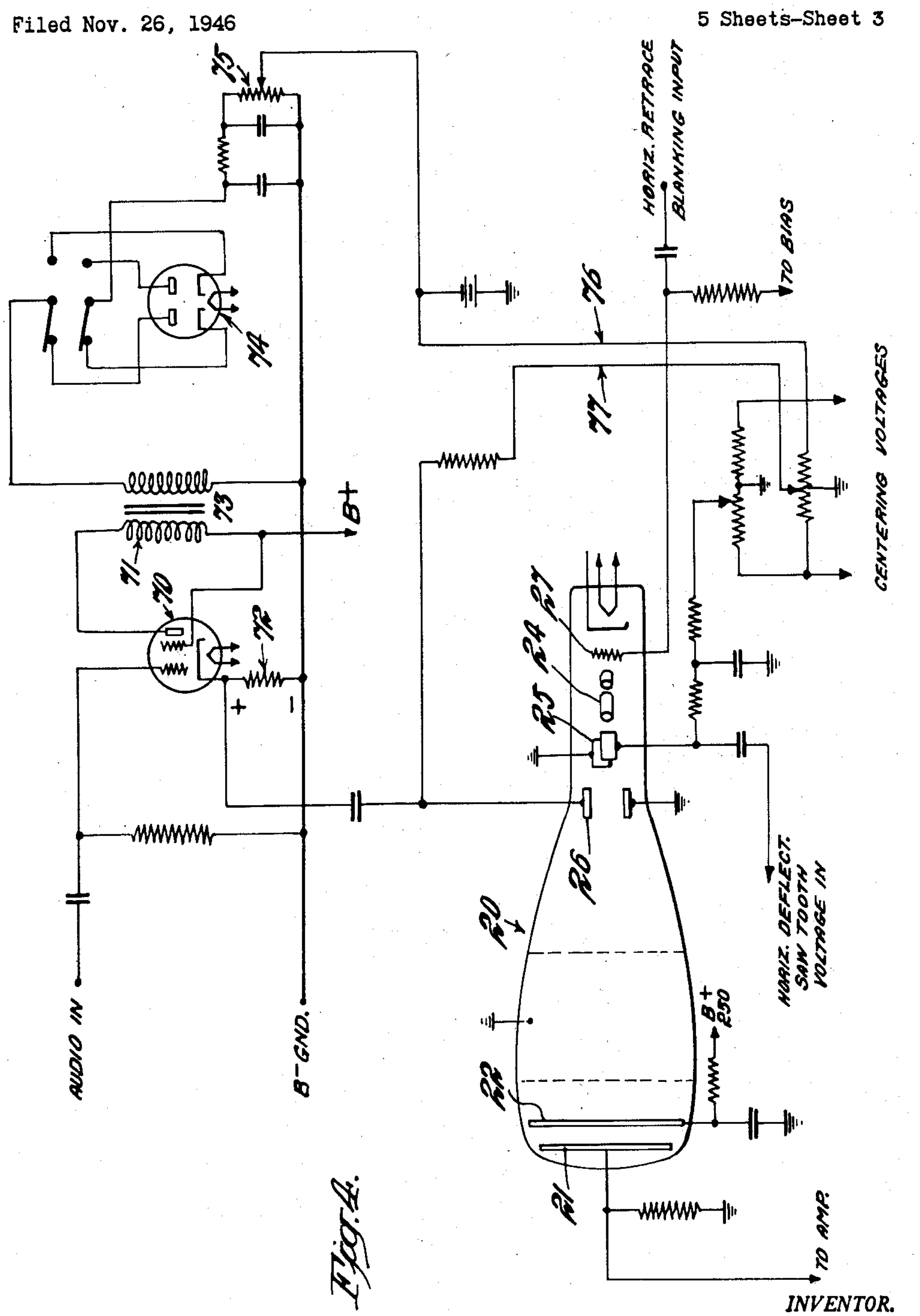
Fig. 4 is a diagram of an electric circuit for operating the pulse-generating tube shown in Fig. 3.

In the form shown in Figs. 3 and 4, the pulse generator consists of a cathode ray tube 20 containing a target T consisting of two parts 21, 22 lying in different planes. The two parts are an anode plate 21 of conducting material connected to the output of the tube and a mask 22 of conducting material insulated from the output of the tube and grounded, most desirably, through a condenser. The composite target T has one or more wedge-shaped high-response areas 23 provided by one or more apertures in the mask 22 which allow the electrons of the electron stream to pass through and strike the anode disc 21. The remaining area of the composite target T is a no-response area since the electrons striking the mask produce no response at the output of the tube.

Figure 3A:
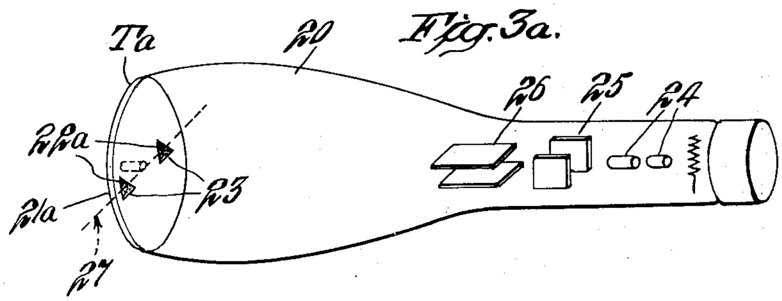
Figs. 3*a* and 3*b* show modifications of the construction shown in Fig. 3.

In the form shown in Fig. 3*a*, the tube is provided with a target T*a* consisting of an aluminum plate 21*a* connected to the output of the tube and having on its front surface one or more wedge-shaped areas 23 covered with a thin layer 22*a* of carbon. Because of the fact that aluminum emits large quantities of secondary electrons when struck by a cathode ray, while carbon emits less quantities, the response of the wedge-shaped areas of the target to the electron stream is only a small fraction of the response of the remainder of its area.

Figure 3B:
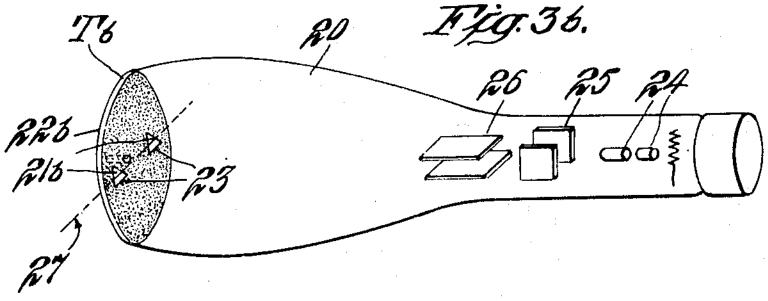

The pulse generator shown in Fig. 3*b* is similar to that shown in Fig. 3*a* except that the wedge-shaped areas 23 of the aluminum disc 21*a* are uncovered, while the remaining area of the disc is covered by a carbon layer 22*b*. Except for a difference in polarity, the tube of Fig. 3*b* acts in the same way as the tube 20 of Fig. 3*a*.

Except for difference in the construction of the target, the pulse generators of Figs. 3, 3*a* and 3*b* are alike. Each may be provided with a conventional electron gun 24 for creating an electron stream and with the usual horizontal and vertical deflecting means 25, 26. The deflecting means are most desirably of the electromagnetic type as shown in Fig. 3. For convenience in illustration, the deflecting means are shown in the other views as electrostatic plates.

The electron stream is deflected so as to trace on the target a line crossing the wedge-shaped areas 23. This may be accomplished by placing the areas 23 on a horizontal line 27 of the target and applying to the horizontal deflecting means 25 a saw-tooth voltage of the type ordinarily applied to the horizontal deflecting means of a cathode ray tube for transmitting pictures. As the electron stream traverses the line 27 of the target, the tube puts out pulses of uniform amplitude whose time-widths depend on the width of an area 23 at the point where the track of the electron stream crosses the area. The pulses are of one polarity in the tubes shown in Figs. 3 and 3*b*, and of the opposite polarity in the tube shown in Fig. 3*a*.

In order to modulate the time-width of the pulse, a modulating voltage such as an audio wave is applied to the vertical deflecting means 26 to deflect the electron stream so as to displace its track laterally from the line 27 and thus bring the track across a different part of the wedge-shaped area 23 so as to vary the time-length of the pulse put out by the tube. The result is to provide a series of pulses of uniform amplitude in which the time-widths of the pulses vary in accordance with the instantaneous values of a modulating voltage.

When the wedge-shaped areas 23 have straight sides as shown in the drawings, the relation between the time-widths of the pulses and the amplitude of the modulating current is linear. By changing the shape of the wedge-shaped area and giving it appropriately curved sides, the time-widths of the pulses may be made to vary in accordance with any desired function of the modulating voltage.

To obtain the best effect, the electron beam should be focused (by the usual focusing means, not shown) on the plane of the target where the wedge-shaped areas 23 are defined, that is, at the plane of the mask 22 of the target T of the tube 20 shown in Fig. 3, or the plane of the front surface of the aluminum disc 21*a* of the targets T*a*, T*b* of the tubes of Figs. 3*a* and 3*b*.

This generator of modulated pulses has the advantage that there is no beating between the pulse frequency and the modulating frequency. The pulse frequency is determined solely by the frequency of the saw-tooth driving voltage applied to the horizontal deflecting means of the tube. The modulating voltage is applied separately to the vertical deflecting means to displace the trace of the beam laterally as it crosses the wedge-shaped area, so that there is no additive or subtractive effect between the driving and modulating voltages.

The deflecting means 25, 26, being of the electromagnetic type, are located on the outside of the tube 20 so that they may be rotationally adjusted on the tube. This is desirable particularly when the target has more than one wedge-shaped area 23 in order that the track 27 of the electron stream may be angularly adjusted so that it passes across all the areas.

Circuit arrangements for obtaining sound-modulated pulses from the new generator are indicated in Figs. 1 and 4. Audio waves received from the microphone 44 are passed through an amplifier 45 and an emphasis-amplifier 46 and then applied to the vertical deflecting means 26 of the tube 20. In addition, a rectified voltage obtained from the amplifier 46 and proportional to the general volume of the sound is applied to this deflecting means. The purpose of this is to make the width of the pulses generally proportional to the volume of sound, so that the modulation applied to the widths of the pulses when the sound volume is low will be a substantial proportion of their width. In this way, the ratio of the degree of modulation to the time-widths of the pulses is maintained substantially uniform.

The circuits for causing the sound modulation are shown in Fig. 4. The tube 70 at the top of this figure is the last stage of the amplifier 46 shown in Fig. 1. The plate of this tube is connected through a reactor 71 to a positive potential. The connection to the vertical deflecting means 26 of the tube 20 applies the voltage drop produced by the plate-cathode current of the tube 70 in a non-reactive resistor 72 connected to the cathode of the tube 70. I have ascertained that this produces a very satisfactory modulation.

Plate current from the tube 70 is passed through a transformer 73 to a rectifier 74 which produces in a resistance 75 a voltage drop proportional to the general volume of the sound. This voltage is applied to the deflecting means 26 through leads 76, 77. The lead 77 also introduces the usual centering voltage.

While the new generator of modulated pulses may be used for many purposes, it possesses peculiar advantages when used in a system for communicating sound and pictures. It may easily be perfectly synchronized with a picture tube by applying to its horizontal deflecting means 25 the same saw-tooth voltage which is applied to the horizontal deflecting means of the picture tube. Thus, as shown in Fig. 1, the horizontal driving pulse from a terminal 31 of the synchronous generator 30 is connected both to the horizontal deflecting means 14 of the picture tube 10 and to the horizontal deflecting means 25 of the pulse tube 20.

Interlacing of the picture signals from successive lines of the picture on the mosaic screen of the picture tube and the pulses from the tube 20 is secured by placing a wedge-shaped area of the target T of the tube 20 near one end of the track of the electron stream on the target, and blanking out the electron stream of the picture tube for a period slightly longer than that of its retrace movement so that no part of the picture signal occurs at the anode of the picture tube when the electron stream of the tube 20 is crossing a wedge-shaped area 23 and creating a pulse.

I find it desirable, although not necessary, to use two wedge-shaped areas 23 in the target T, placing them near opposite ends of the line 27 on the target T, and to make the blanking period of the picture tube begin just before the beginning of the retrace movement of its electron stream and end just after the end of the retrace movement. This arrangement is shown diagrammatically in the timing diagram, Fig. 5. The electron stream of the tube 20 is blanked out during its retrace movement so that sound pulses are produced only at the beginning and end of the forward movement of the electron streams in the picture and sound tubes. While I have found this arrangement most desirable, it should be noted that other methods of interlacing are available, such for example as blanking out the electron stream of the tube 20 during its forward movement so that the sound pulses occur during the retrace movement of the streams of both tubes.

Figure 5:
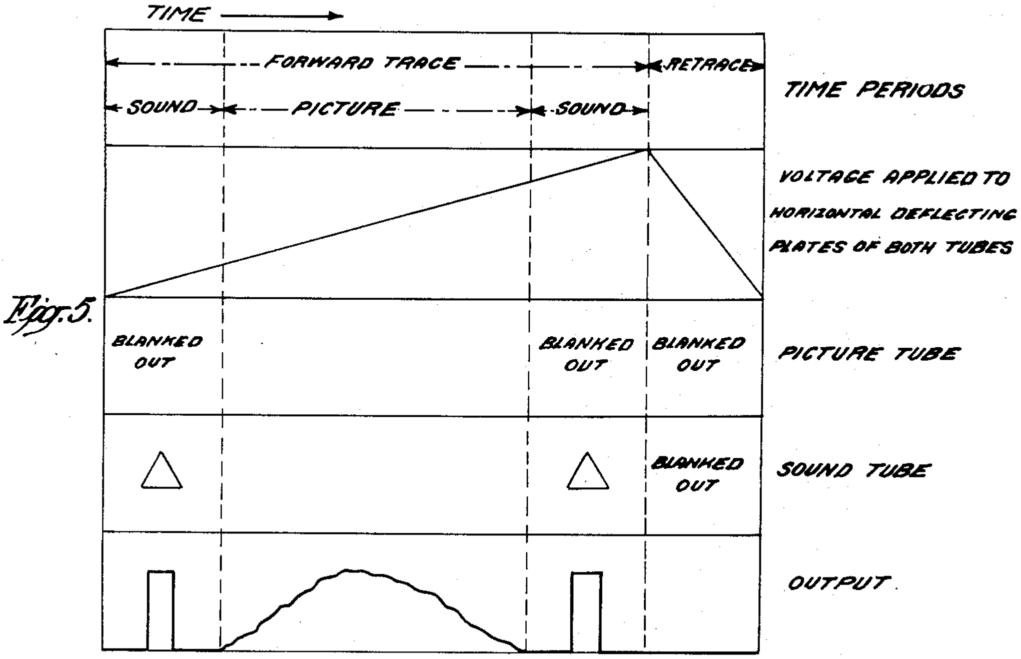
Fig. 5 is a timing diagram of the transmitter of my system.

Circuit arrangements for providing the timing shown in Fig. 5 are indicated in Fig. 1 and in Fig. 6. The synchronous generator shown in these figures differs only in minor respects from a standard synchronous generator for television. It is provided with the usual 60-cycle phase shift circuit A, 60-cycle lock-in circuit B and oscillator O, and with the frequency dividing circuits F, delay circuits D, multi-vibrators MV, limiters L, and mixers M required to produce at its outputs 31 to 35 the different pulses used in a television system. The generator illustrated in Fig. 5 differs from the ordinary generator by the addition of an output 36. The kinescope blanking impulse at the output 34, which is connected to the mixer 37, is a combination of a horizontal blanking impulse derived from the multi-vibrator 38 and a vertical blanking impulse derived from the multi-vibrator 39. The new output 36 is connected to the multi-vibrator 38 in advance of the mixer 37, so that only the horizontal blanking impulse is felt at the output 36.

As shown in Fig. 1, the outputs 31, 32 of the synchronous generator are connected to the picture tube 10 and to the mixing amplifier in its output circuit in the usual manner. However, an adjustment is made in the synchronous generator which changes the usual character of the iconoscope blanking impulse from the output 33. The multi-vibrator 33*a* which produces the horizontal blanking component of the iconoscope blanking impulse (Fig. 5) is adjusted to increase the usual length of the horizontal blanking pulse so that it starts slightly before the beginning of the retrace period and terminates slightly after the end of the retrace period. This adjustment may easily be made by means of the horizontal iconoscope blank width control which is ordinarily provided in the synchronous generator to control the multi-vibrator 33*a*.

The sound tube 20 is controlled by the synchronous generator in a different manner. The horizontal driving impulse from the synchronous generator output 31 is led through an amplifier to the horizontal deflecting means 25 of the tube 20, but the vertical driving impulse from the output 32 is not connected to the tube 20. The kinescope horizontal blanking impulse from the new terminal 36 of the synchronous generator is connected through an amplifier to the grid 27 of the tube 20 to blank out the beam during the retrace period; but the iconoscope blanking impulse from the output 33 is not connected to the tube 20.

Since no vertical blanking or driving impulses are applied to the tube 20, it continues to generate sound-modulated pulses without interruption during the vertical retrace period of the picture tube 10. This is of great importance in order to secure continuity of sound.

In order that the sound-modulated pulses which are generated during the vertical retrace period of the picture tube may not be obliterated by the kinescope blanking impulses from the output 34 of the synchronous generator when the two are brought together in the mixing amplifier 43 (Fig 1), the sound pulses are given a polarity opposite to that of the kinescope blanking impulse.

In the system of television customarily used in the United States, the polarity of the blanking impulses is the same as the polarity of the picture signals. In applying my system to this type of television, the sound pulses are given a polarity opposite to that of the picture signals at the point where they are brought together.

In the system of television which is customarily used in England, the blanking impulses have a polarity opposite to that of the picture signals. In applying my system to the English type of television, the polarity of the sound pulses is, therefore, made the same as the polarity of the picture signals at the point where they are brought together.

The effect of giving the sound pulses a polarity opposite to that of the blanking impulses is shown in Fig. 6*a*. This figure shows the wave form of a part of the signal put out by the transmitter of Fig. 1 when the picture tube 10 of that figure is operated as is customary in this country and when only one wedge-shaped area 23 is used in the target key of the tube 20. As shown in this figure, the blanking impulses have a positive polarity while the sound pulses have a negative polarity, so that they are not obliterated during the vertical retrace blanking illustrated in the middle part of Fig. 6*a*. A change in the voltage position of the ends of the pulses is caused by the vertical synchronous pulse during the period *a* shown in Fig. 6*a*, but the effect of this is eliminated by a limiter in the receiver as hereinafter explained.

The separation of the interlaced picture signals and sound-modulated pulses at the receiving end of the system may be effected by conventional means. Thus, the amplitude of the sound pulses may be made greater than that of the picture signals to extend the pulses into the "ultra-white" region so that they may be separated by a clipper circuit of opposite polarity from that ordinarily used to separate out the synchronizing signal which extends into the "ultra-black" region. It is more desirable, however, to separate out the sound pulses by an electronic switch or a gating circuit, that is, a circuit which is made periodically conductive only at the time of each pulse. Such a circuit may be synchronized by means of the synchronous signal which is used to control the scanning operation of the picture tube at the receiving end. While my invention may be carried out with either of these separating means, a more desirable method of effecting the separation is by means of a special cathode tube which forms a part of my invention.

The cathode ray tube 50 indicated in Fig. 2 is shown in detail in Fig. 7. It may resemble an ordinary picture-receiving tube, such as a kinescope, in having a standard electron gun 53 and standard horizontal and vertical deflecting means 54, 55 and a "screen" of fluorescent material 51. It differs from the ordinary kinescope in having one or more anodes 52 each having the form of a metal strip extending along or in front of a vertical edge of the screen. The position of the intersections of a strip 52 with horizontal lines on the screen 51 corresponds to the position of a wedge-shaped area 23 on the line 27 of the target T of a cathode ray tube 20 shown in Fig. 3. When two areas 23 are used as shown in Fig. 3, there are two strips 52 lying along or in front of opposite vertical edges of the screen 51. The strips are most desirably made of aluminum so that their response to an electron stream will be increased by the release of secondary electrons. It is desirable, but not essential, to provide in the tube 50 a mask 56 containing a central picture aperture 57 and two narrow lateral apertures 58. The anode strips 52 are located directly behind the lateral apertures.

By the conventional means indicated in Fig. 2, the electron stream of the cathode ray tube 50 is given a scanning movement over the area defined by the three openings in the mask 56. The interlaced picture signals and sound-modulated pulses are applied to the grid of the electron gun 53 of the tube 50. As a result of the timing of the signals and pulses indicated in Fig. 5, the electrons during each picture signal pass through the aperture 57 and strike the screen 51, while the electrons emitted during the pulses pass through the narrow apertures 58 and strike one or the other of the anode strips 52.

An important advantage of this means for separating the sound pulses and picture signals lies in the fact that it requires the user of the receiver to focus the receiver picture so that it just covers the screen area which it is intended to cover and thus corresponds exactly to the picture transmitted. Any attempt by the user of the receiver to change the picture from its intended size will result in preventing the sound pulses from striking the anode 52, so that no sound will be heard. It may be noted, however, that the use of this method of separation makes it necessary to generate the sound pulses during a part of the forward tracing movement of the electron streams of the cathode ray tubes at the transmitting station. If the pulses are created during the retrace movements of the electron streams of these tubes, it is necessary to use a clipper circuit or gating circuit to separate the sound pulses from the picture signals.

The recreation of the sound from the sound-modulated pulses constitutes an important part of my invention. Previous means for this purpose have included filters and have operated unsatisfactorily. My method consists in applying the series of the sound-modulated pulses to a resonant circuit tuned to an integral multiple of the frequency of recurrence of the pulses. A tuned circuit is an inertia device in the sense that a pulse applied to it will create in it a sinusoidal current oscillation which decays, i. e., decreases in amplitude to zero, over a period of time dependent upon the Q of the circuit. The resonant circuit used in my method has a resistance low enough to cause the oscillation set up by a single pulse to persist much longer than the interval between successive pulses or, in other words, the decay period of the circuit is longer than the interval between successive portions. Since the circuit is tuned to an integral multiple of the frequency of recurrence of the pulses, the trains of waves set up by successive pulses are in phase. The additive effect of the trains of waves set up by the successive uniformly spaced pulses produces a sinusoidal wave of the frequency to which the circuit is tuned and of an amplitude which varies in accordance with the energy of successive pulses. Thus, by applying the pulses to the tuned circuit without the application of any other energy thereto, there is set up in the circuit that which is in effect a sinusoidal carrier wave modulated by the variation in the energy of the pulses, which corresponds to the original modulation of the pulses. Thus, the resonant circuit provides a sound-modulated sinusoidal carrier from which the sound may easily be recovered by an ordinary detector or demodulator.

While this method will operate when the resonant circuit is tuned to any integral multiple of the frequency of recurrence of the pulses, a feature of my invention consists in tuning the circuit to an harmonic of the frequency of recurrence of the pulses rather than to the same frequency as that of the recurrence of the pulses. When my system of transmitting sound is used in connection with the transmission of pictures in the manner previously described, the frequency of recurrence of the sound pulses is the same as the frequency of the saw-tooth wave which causes the horizontal deflection in the picture tube, that is to say, a frequency of about 15,000 cycles per second. This frequency is enough higher than the frequency of the sound to be transmitted to provide for frequent sampling of the sound; but demodulating a sinusoidal sound-modulated carrier of this frequency produces audible beats. It follows that if the resonant circuit be tuned to the frequency of the pulses, audible beats are produced by the detector which interfere with the reception of the sound. I avoid this difficulty by tuning the resonant circuit to an harmonic of the frequency of recurrence of the pulses, so that the sinusoidal carrier created in the circuit has a frequency very much higher than that of the sound to be transmitted. By tuning the circuit to the first or second harmonic of the frequency of recurrence of the pulses, I obtain a sinusoidal carrier wave having a frequency of 30,000 or 45,000 cycles per second. The frequency of either of these carriers is so high that demodulating it in a detector produces no audible beats to interfere with the reception of the sound.

In the system which has been described, the variation in the energy of the pulses results from a variation in the time-width of the pulses. It should be noted, however, that my method of recreating sound from the pulses is applicable to a series of pulses whose energy has been modulated in any manner, for example, by variation in amplitude.

In the form of the system which I have indicated as most desirable—that in which two apertures 23 at opposite ends of the line 27 are provided in the mask of the tube 20—the pulses considered individually are not evenly spaced. However, they constitute two series of evenly spaced pulses. Each series has the same frequency of recurrence, which is the frequency of the saw-tooth voltage applied to the horizontal deflecting means of the tube 20. When the two series of pulses are applied to a resonant circuit tuned to an harmonic of this frequency, each series creates a modulated sinusoidal carrier wave. The two carrier waves are out of phase, but, as they are of the same frequency, they may both be eliminated by an ordinary detector so that the modulations of both carriers are recovered. The sound is thus recreated from samples taken at more frequent intervals than when a single aperture is used in the mask of the pulse-generating tube 20.

A circuit for practicing the method which has been described is shown in Fig. 8. This circuit includes the resonant circuit 61, the detector 62, the limiter 63 and the amplifiers 64, 65 which are indicated in the block diagram, Fig. 2. The sound-modulated pulses are conducted from the strip anodes 52 of the tube 50 (or from other separating means) to the limiter 63. The characteristic of the limiter is such that the variation in the voltage of the pulses caused by the vertical synchronous pulse during each vertical retrace period of the picture tube (see period *a* in Fig. 5) is clipped off so as to make all the pulses once more of uniform amplitude, so that their variation in energy depends solely upon their variation in width. By means of a transformer 66, the clipped or limited pulses of uniform amplitude are applied to the resonant circuit 61 which includes the transformer 66 and variable condensers 68. This circuit is tuned to an harmonic of the pulse frequency. I find it most desirable to use the second harmonic which, in the specific example illustrated, is twice the frequency of the saw-tooth voltage applied to the horizontal deflecting plates of all the tubes. The two modulated carriers produced in the resonant circuit 61 are amplified in the amplifier 64 and then led through a transformer 69 to the detector or demodulator 62. The audio wave from the detector is led through the audio amplifier 65 to a telephone or speaker 60 (Fig. 2).

The extraordinary fidelity of the reproduction of sound by the system which has been described is, in my opinion, at least partially the result of the following features which are combined in my system:

(1) The use of pulses having a frequency of recurrence materially above the frequency of the sound to be communicated.

(2) A generator of modulated pulses in which separate means having no additive effect are used to determine the frequency of recurrence of the pulses and the energy of the pulses, so that there is no beating between the frequency of the pulses and the modulation frequency.

(3) The use of the energy of the pulses to create a modulated sinusoidal carrier of a frequency higher than the frequency of recurrence of the pulses, from which the sound may readily be recovered by the use of an ordinary detector or demodulator.

It should be understood that in the claims which follow the terms "horizontal" and "vertical" are used in a relative sense only, as it would obviously not affect the operation of the apparatus to rotate any one of the tubes through an angle of 90°.

What I claim is:

1. In a television system, means for transmitting television signals, means for receiving said signals, a first cathode ray tube at said transmitting means for translating light waves into video signal electrical waves, the output of said first tube being connected to modulate the signals in said transmitting means, a second cathode ray tube at said transmitting means having a target therewithin comprising a wedge-shaped area to be scanned by the electron stream of said tube, said wedge-shaped area having a response to said electron stream differing from the response of the remaining area of the target, means connecting the output of said second tube to modulate the signals of said transmitting means, a third cathode ray tube having a picture-reproducing screen and being connected to said receiving means to vary the electron stream intensity in accordance with the received said signals, said third tube having a metallic strip extending vertically adjacent the edge of the picture-reproducing screen thereof, and positioned to intercept all the horizontal scanning lines of said tube at the end of each thereof, means for synchronizing the horizontal scanning of the three said tubes, means for synchronizing the vertical scanning of the first said tube and the third said tube, means connected to said second tube and to a source of audio signals of said transmitting means for scanning vertically the said wedge-shaped area in accordance with said audio signals thereby modulating the signal of said transmitting means with electrical pulses varying in width, means for synchronizing the horizontal scanning of the wedge-shaped area of said second tube to occur simultaneously with the end of each horizontal scanning line of the first and third said tubes, the said vertical strip in said third tube thereby receiving thereon the electron stream varied in intensity in accordance with said pulses modulated in width.

2. The apparatus of claim 1 in which said target and wedge-shaped area of said second tube comprises an anode and an electron intercepting mask positioned in the path of the electron stream, said mask having a wedge-shaped aperture.

3. In a system for communicating sound and pictures, means at the transmitting end for creating a video signal containing horizontal and vertical blanking impulses of different amplitudes, means for creating a series of sound-modulated pulses of uniform amplitude and of a polarity opposite to that of the blanking impulses and imposing said pulses on the video signal, means at the receiving end for separating said sound pulses from the video signal, a limiter for eliminating from the sound pulses the variations in amplitude caused by the variation in the amplitude of the blanking impulses on which they were imposed, and means for reconverting the pulses of uniform amplitude into sound.

JAMES E. ROBINSON.

References Cited in the file of this patent

UNITED STATES PATENTS

| Number | Name | Date |
|---|---|---|
| 1,757,345 | Strobel | May 6, 1930 |
| 2,089,639 | Bedford | Aug. 10, 1937 |
| 2,144,337 | Koch | Jan. 17, 1939 |
| 2,195,676 | McCarthy | Apr. 2, 1940 |
| 2,256,336 | Beatty | Sept. 16, 1941 |
| 2,257,795 | Gray | Oct. 7, 1941 |
| 2,258,943 | Bedford | Oct. 14, 1941 |
| 2,296,050 | Poch | Sept. 15, 1942 |
| 2,301,504 | Batchelor | Nov. 10, 1942 |
| 2,308,639 | Beatty | Jan. 19, 1943 |
| 2,391,776 | Frendendall | Dec. 25, 1945 |
| 2,401,384 | Young | June 4, 1946 |
| 2,405,252 | Goldsmith | Aug. 6, 1946 |
| 2,408,063 | Greig | Sept. 24, 1946 |
| 2,409,488 | Homrighous | Oct. 15, 1946 |
| 2,416,330 | Labin | Feb. 25, 1947 |
| 2,419,570 | Labin | Apr. 29, 1948 |
| 2,477,625 | Labin | Aug. 2, 1949 |

FOREIGN PATENTS

| Number | Country | Date |
|---|---|---|
| 527,904 | Great Britain | Oct. 18, 1940 |
| 564,511 | Great Britain | Oct. 2, 1944 |

OTHER REFERENCES

British Journal I. E. E., pages 251 to 254, July 1947.

Electrical Communication, vol. 23, pages 159–178, 1946.